United States Patent [19]
Hettich

[11] Patent Number: 5,546,739
[45] Date of Patent: Aug. 20, 1996

[54] RADIAL RAKE DEVICE

[76] Inventor: Allen J. Hettich, 6200 S. Shore Dr., Aberdeen, S. Dak. 57401

[21] Appl. No.: 535,756

[22] Filed: Sep. 28, 1995

Related U.S. Application Data

[62] Division of Ser. No. 442,135, May 16, 1995, Pat. No. 5,479,768, which is a continuation of Ser. No. 87,195, Jul. 2, 1993, abandoned.

[51] Int. Cl.$^6$ ................................................ A01D 78/14
[52] U.S. Cl. ................................ 56/367; 56/370; 56/400; 56/400.21; 460/122
[58] Field of Search ............................ 56/367, 370, 377, 56/365, 400, 400.01, 400.21; 460/121, 122

[56] References Cited

U.S. PATENT DOCUMENTS

| | | |
|---|---|---|
| 2,861,412 | 11/1958 | van der Lely et al. |
| 2,977,743 | 4/1961 | Giles. |
| 3,101,584 | 8/1963 | van der Lely et al. ............ 56/377 |
| 3,108,425 | 10/1963 | van der Lely et al. ............ 56/377 |
| 3,706,191 | 12/1972 | Barbot ................................ 56/377 |
| 4,183,198 | 1/1980 | Sligter ............................... 56/377 |
| 4,324,093 | 4/1982 | van der Lely et al. ............ 56/377 |
| 4,753,063 | 6/1988 | Buck .................................. 56/377 |
| 4,977,734 | 12/1990 | Rowe et al. ....................... 56/15.9 |
| 5,065,570 | 11/1991 | Kuehn ............................... 56/377 |

FOREIGN PATENT DOCUMENTS 267941  4/1968  Australia.

Primary Examiner—Terry Lee Melius
Attorney, Agent, or Firm—Merchant, Gould, Smith, Edell, Welter & Schmidt

[57] ABSTRACT

A turf care implement includes a frame mounted on a pair of opposed wheels. The frame supports a pair of lift arms which are mounted at an angle to the direction of travel of the implement. The lift arms support a plurality of rakes on mounting arms. The radial-type wheel rakes which have tines extending radially outward from a central hub. A series of cables and pulleys connects from the lift arms to a lift handle by a forward portion of the frame for raising and lowering the arms and positioning the arms at various heights.

8 Claims, 4 Drawing Sheets

5,546,739

RADIAL RAKE DEVICE

This is a divisional of application Ser. No. 08/442,135, filed May 16, 1995, now issued as U.S. Pat. No. 5,479,768, which is a continuation of Ser. No. 08/087,195, filed Jul. 2, 1993, now abandoned, which applications are incorporated herein by reference.

BACKGROUND OF THE INVENTION

1. Field of the Invention

The present invention is directed to a raking apparatus, and in particular to a lawn care apparatus.

2. Description of the Prior Art

Lawns require constant care and upkeep in order to maintain a pleasing appearance. A lush green lawn is generally preferred which is free of weeds and which is well trimmed. In order to achieve a well-groomed lawn, it must be mowed and the clippings must be raked regularly, sometimes every four or five days. For very large lawns, this job is time-consuming and labor-intensive. Even if a riding mower is used, the clippings are scattered and must be raked by hand.

Heretofore, there has not been a satisfactory and time saving way of raking the clippings or leaves. Commercial rakes are typically very expensive and designed for much larger areas and are not suited to be towed by the typical lawn and garden tractor. Implements having wheel-type radial rakes are generally designed for hay fields and are not suitable for lawns. Large commercial rakes cannot be stored in the typical garage or shed. Such devices are also not suited for raking up debris or fallen twigs, leaves or branches.

In addition to raking, devices are needed for dethatching the lawn in order to promote healthier grass. Adjustment of the depth and tension of the rake tines and raking angle could provide for use of a single device for various types of raking in addition to dethatching. The rakes should also be retractable during transporting and storage.

It can be seen then, that an apparatus is needed which may be used with a lawn and garden tractor for raking lawn clippings. Such an apparatus should be adjustable to be used for either dethatching or various raking tasks. A rake should be towable behind a typical lawn and garden tractor and be capable of being easily stored in a garage or shed.

SUMMARY OF THE INVENTION

The present invention is directed to a rake apparatus such as may be towed by a lawn and garden tractor. The rake has a frame riding on a pair of wheels and tongue extending forward to facilitate towing. The frame also supports weight boxes which may be filled with bricks, rocks, or water containers etc. to increase the downward force on the rake.

The frame supports a floating assembly which includes a pair of lift arms at an oblique angle to the direction of travel. The lift arms are pivotally mounted to be raised and lowered. The arms are connected by a system of cables and pulleys to a lift handle mounted on the tongue. The lift handle pivots and may be locked into a number of positions for varying the height of the lift arms.

Each of the lift arms has a rake support arm mounted thereon. The rake support arms have a number of radial wheel type rakes mounted thereon. The rakes mount on a rotational hub and have tines extending radially outward therefrom. The support arms pivot on the lift arms so that the rakes may ride over uneven terrain.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals designate corresponding elements throughout the several views.

DETAILED DESCRIPTION OF THE PREFERRED EMBODIMENT(S)

Figure 1:
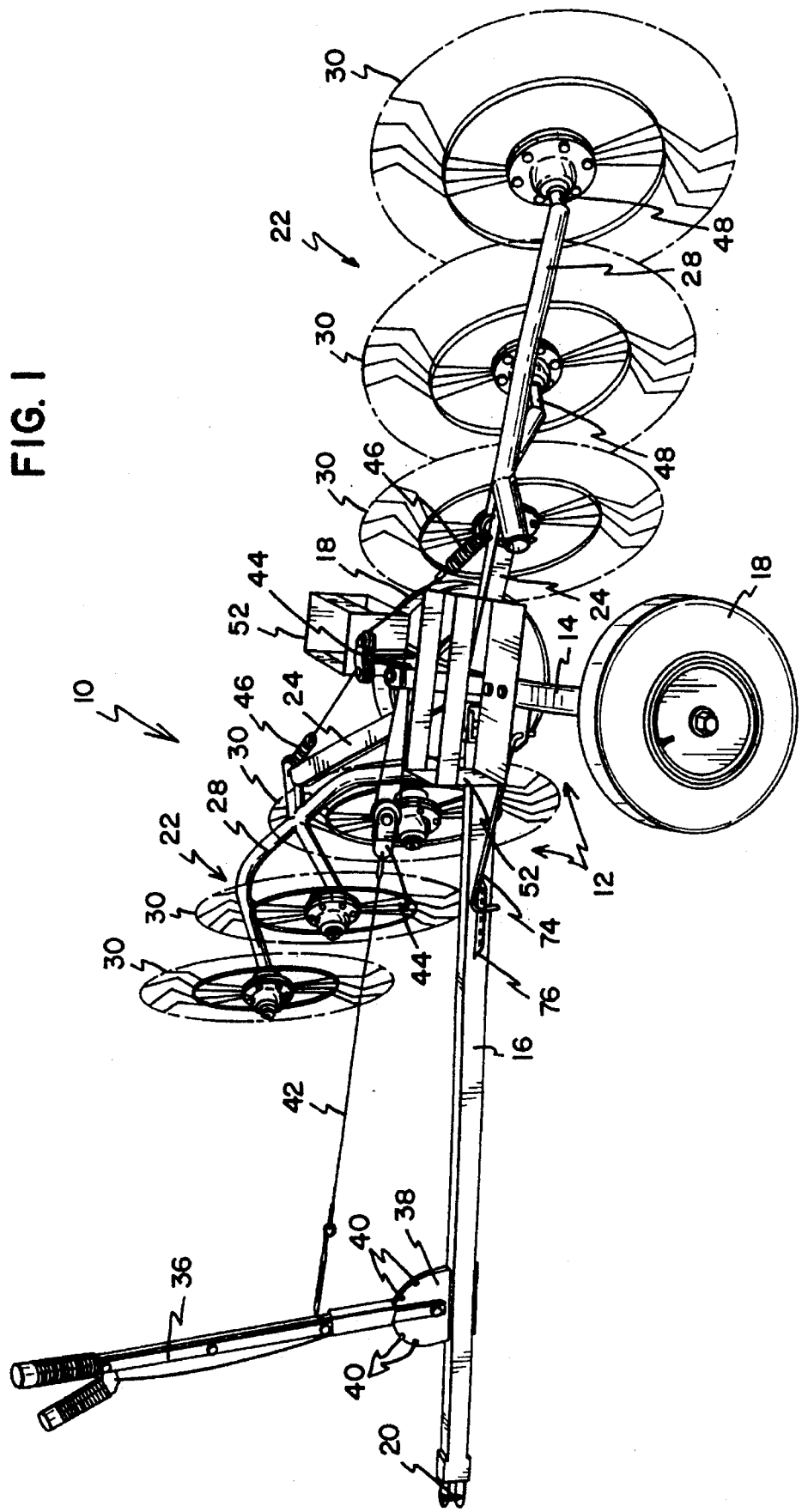
FIG. 1 shows a perspective view of a turf care implement according to the principles of the present invention with the rakes shown raised.

Referring now to the drawings, wherein like reference numerals designate corresponding structure throughout the views, and referring in particular to FIG. 1, there is shown a turf care implement, generally designated 10. The turf care implement 10 has a frame 12 including a cross member 14 and a tongue member 16 extending forward from the cross member. The frame 12 has wheels 18 mounted on either side of the cross member 14 to provide for rolling. At the front of the tongue 16 is a coupling pin 20 which allows the implement 10 to be attached to a lawn and garden tractor or other vehicle for towing. The frame 12 supports a pair of floating assemblies 22 which are mounted to the frame 12 on lift arms 24. The lift arms 24 are mounted about a pivot pin 26 at the underside of the frame 12, as explained hereinafter. Each of the lift arms 24 rotatably supports a rake support arm 28 about a center support arm axis in each floating assembly 22. On each rake support arm 28 are mounted three wheel-type rakes 30. The frame 12 has a connecting pivot, generally designated 32, between the tongue 16 and the cross member 14 for changing the towing angle, as explained hereinafter.

The floating assemblies 22 can be lifted and lowered between a lowered use position and a raised non-use position by actuation of a lift handle 36 mounted on the tongue 16. The lift handle 36 is hand-actuated and pivots about a plate 38 having notches 40 formed therein for engaging and stopping the handle 36 at various positions. A cable 42 runs from the handle 36 through a series of pulleys 44 and springs 46 to mount to the lift arms 24. The frame 12 also includes weight boxes 52 which may be filled with bricks, rocks or other objects to provide added downward pressure on the implement 10. It can be appreciated that the weight boxes 52 have been removed from FIGS. 2 through 4 in order to add greater clarity.

Figure 2:
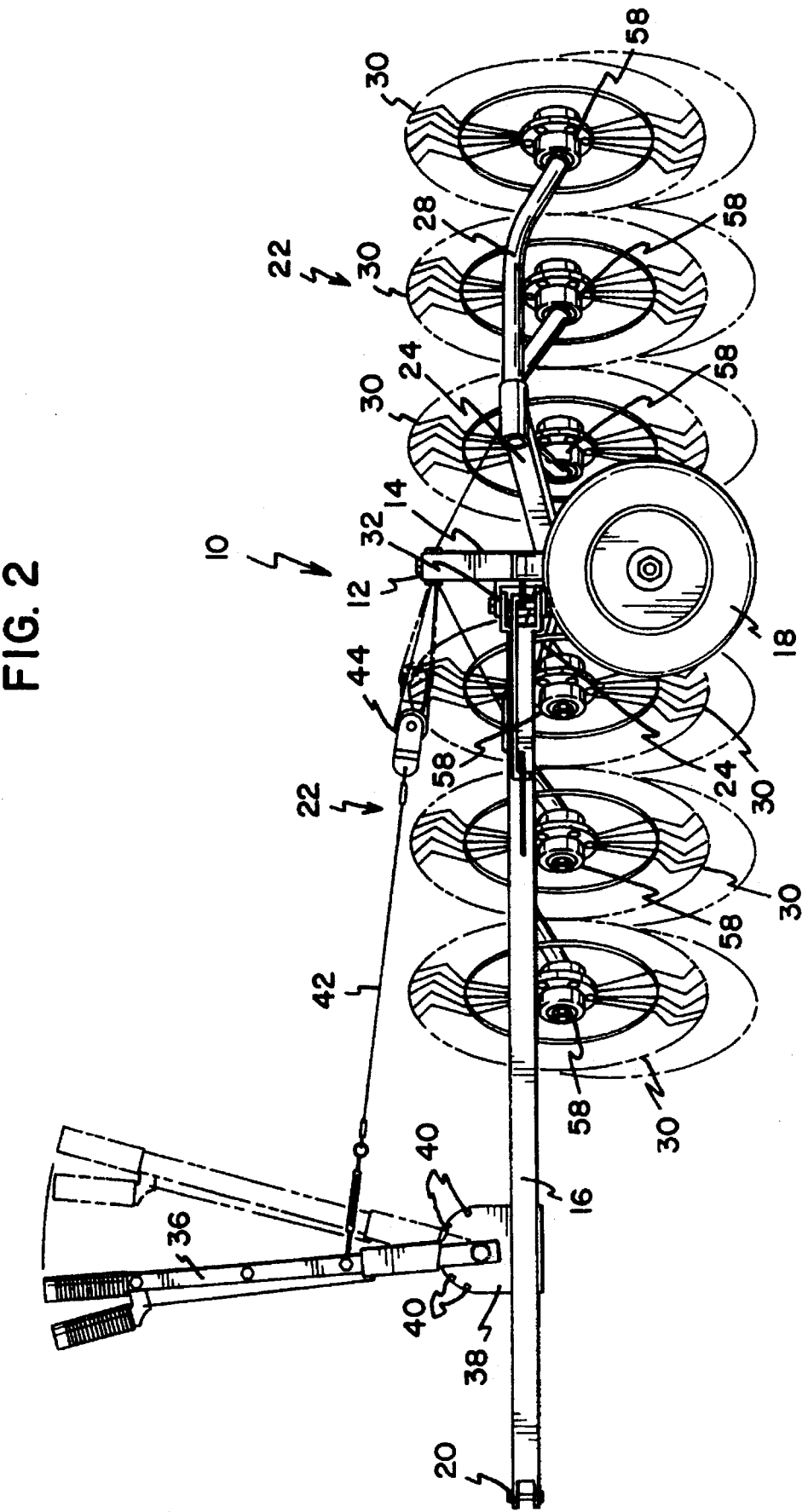
FIG. 2 shows a side elevational view of the turf care implement shown in FIG. 1.

Referring now to FIG. 2, the floating assemblies 22 may be raised or lowered, as shown in phantom. Actuation of the handle 36 between a forward and rearward position lowers and raises the floating assemblies 22 by pulling on the cable 42 which connects to the lift arms 24. As shown more clearly in FIGS. 3 and 4, the cable 42 extends to both lift arms 24 through the series of pulleys 44 and maintains tension with springs 46. The lift arms 24 are mounted at an angle offset from the axis of the cross member 14. In this manner, the lift arms 24, as well as the rake support arms 28 and the rakes 30 are pulled at an angle oblique to the direction of travel. The lift arms 24 mount about a pivot pin 26 below the frame cross member 14 out of the way of the cable 42, pulleys 44 and weight boxes 52.

Figure 3:
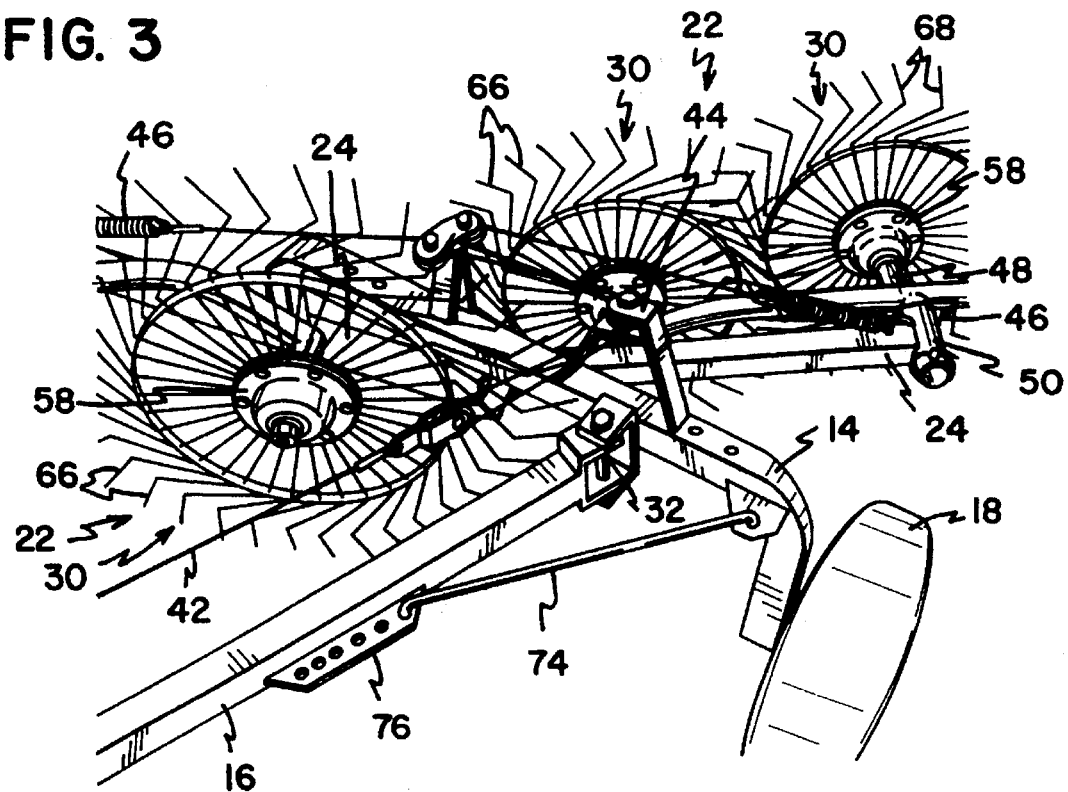
FIG. 3 shows a perspective view of the rake assemblies pivot mechanisms of the implement shown in FIG. 1 with the rakes in a lowered position.
Figure 4:
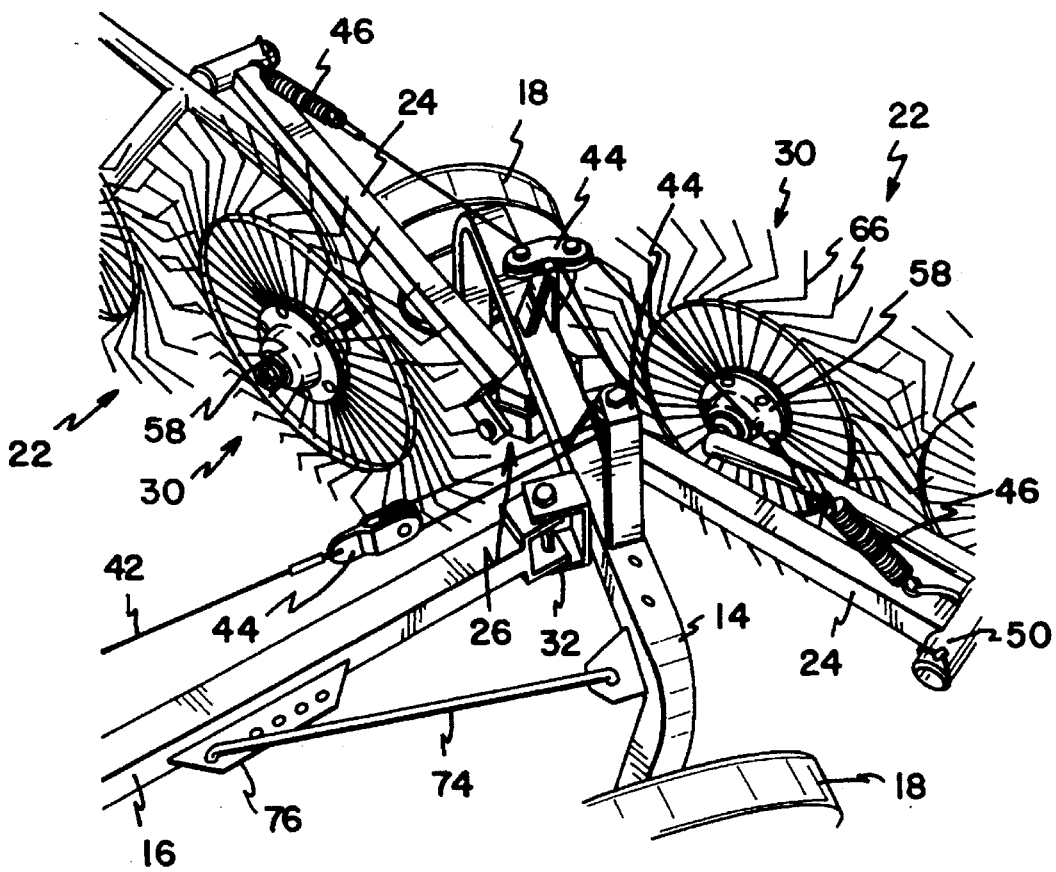
FIG. 4 shows a perspective view of the rake assemblies pivot mechanisms with the rakes in a raised position; and, FIG. 5 shows an exploded view of a wheel rake and hub according to the principles of the present invention.

The angle to the direction of travel may be varied by adjusting the angle between the tongue 16 and the cross member 14. As shown most clearly in FIGS. 3 and 4, the tongue 16 mounts to the cross member 14 about a pivot pin 32. This provides for changing the intersection angle between the tongue 16 and the cross member 14. An angle adjustment pin 74 attached to the frame cross member 14 mounts into a plate 76 on the tongue 16. The angle adjustment plate 76 includes a plurality of orifices formed therein through which a portion of the angle adjustment pin 74 may be inserted. As shown in FIG. 3, the angle adjustment pin 74 is placed in the rearmost orifice in the plate 76. This causes the tongue 16 to be pushed to the left, as viewed in FIG. 3, and causes the rakes 30 to be pulled at a smaller angle relative to an axis extending along the direction of travel. As shown in FIG. 4, when the angle adjustment pin 74 is moved to the frontmost orifice in the plate 76, the tongue 16 is moved to the right in the view shown in FIG. 3. This causes the rakes 30 to be positioned at a greater angle relative to an axis extending along the direction of travel of the implement 10.

As shown in FIG. 3, when the lift handle 36 is in a rear position so that the rake assemblies 22 are lowered, the rakes 30 travel at an oblique angle to the direction of travel and engage the turf. Each rake 30 is mounted to spin about an axle portion 48 of the rake support arm 28. This allows for rotation of the rakes 30 when engaging the ground. Bent end portions 68 of rake tines 66 of the radial wheel-type rakes 30 impart rotation to the rakes as the implement 10 is towed. The rotation of the rakes 30 decreases damage to the lawn and decreases the likelihood of bending the rake tines 66.

Each floating assembly 22 supports three rakes 30 about the axles 48. The rake support arms 28 are pivotally mounted on the ends of the lift arms 24. The lift arms 24, in turn, are supported by the cable 42 with a tensioning spring 46 pulling on the arms 24. The tensioning spring 46 and the pivotal mounting of the lift arms 24 on the frame 12 allow the rakes 30 to ride over bumps and other crevices and irregularities on the ground. In this manner, each floating assembly 22 appears to float over the surface irregularities and along with the flexibility in the tine 66, provides for greater rake coverage and increases turf contact and lessens the likelihood of breakdown or failure of the implement 10. The tensioning springs 46 extend along the orientation of the cable 42 and maintains upward pressure on the floating assemblies 22. This arrangement improves rake flexure and contact time with the turf and decreases rake pressure. The rake support arms 28 are retained on the lift arms 24 by retainer pins 50. Upon removal of the pins 50, the support arms 28 may be easily removed from the lift arms 24. This allows for easier storage of the turf care implement 10 and also interchangeability between the support arms 28 so that the tines 66 may be switched between the front and rear positions.

It can be appreciated that the cable and pulley system of the present invention routes the cable 42 from the lift handle 36, as shown most clearly in FIGS. 1 and 2, through the pulleys 44 mounted above the tongue 16 and over the cross member 14, as shown most clearly in FIGS. 3 and 4. The pulleys 44 then direct the cable 42 from a location above the pivot position 26 of the lift arms to the ends of the lift arms 24. In this manner, when the handle 36 is pulled, leverage is applied along the proper direction of travel of the lift arms 24 so that the lift arms 24 are easier to lift, with force being applied in a mechanically advantageous direction. It can also be appreciated that with the springs 46 and the adjustment notches 40, the floating assemblies 22 may be raised and lowered to perform different tasks while allowing the float assemblies 22 to ride or float independently. The rakes 30 may be used to thatch, to windrow cut grass, or for other raking tasks, such as gathering leaves, debris, or twigs and small branches. With the rakes raised slightly, there will be less tension on the tines 66, so that the type of task to be performed will dictate the rake height adjustment.

Figure 5:
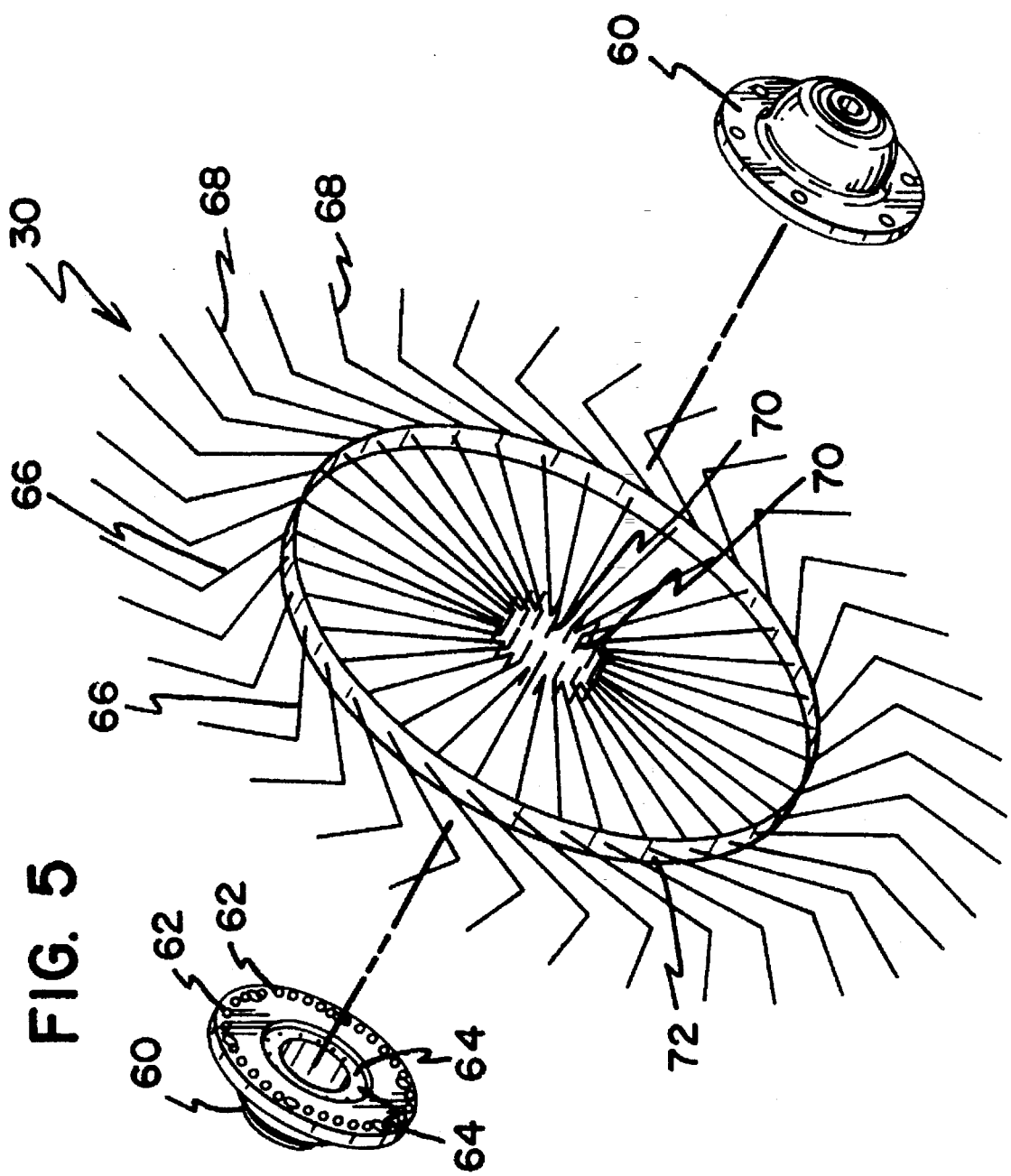

Referring now to FIG. 5, there is shown an exploded view of the wheel-type radial rake 30 according to the present invention. The rake includes a multiplicity of tines 66 extending radially outward from a central hub shown in FIGS. 1–4. The hub 58 has a pair of opposed hub sections 60, shown most clearly in FIG. 5. The tines 66 include bent end outer portions 68 extending within the plane of the tines which provide for imparting rotation when the rakes are towed at an angle. The outer end portions 68 angle toward a first radial direction and then back towards a second radial direction to add flexure to the tines 66. The tines 66 mount into the hub sections 60 which may include a central bearing to provide easier rotation of the rake 30. The hub sections 60 include a plurality of bores 64 which receive bent inner end portions 70 on the tines 66. The bent inner end portions 70 are directed along the axial direction of the hub 60 and are alternated so that alternating end portions 70 insert into bores 64 in one hub section 60 and then the other section 60. In addition, a plurality of raised cylinders serving as tine-divider portions 62 on each inner portion of the hub sections 60 are spaced annularly about the hub sections 60 so that the tines 66 insert intermediate the sections 60 and are spaced between the tine-divider portions 62. Additional bracing of each rake 30 is provided by an outer ring 72 which has a multiplicity of orifices, each orifice receiving each of the tines 66. With this configuration, assembly of the rakes 30 can be easily accomplished with little labor. The hub 58 and support ring 72 provide for reliable operation and support for the rake 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A wheel type radial rake, comprising:

a central hub having opposed hub sections with an axial central opening formed therein;

a plurality of tines extending radially outward from the hub, each of the tines having a bent inner portion extending along an axial direction;

wherein each of the hub sections has a plurality of axially extending bores formed therein spaced in an annular ring and configured for receiving the bent inner portions of the tines and a plurality of raised portions annularly spaced on the hub sections radially outward from the bores, wherein the raised portions are spaced to receive a tine between adjacent raised portions.

2. A radial rake according to claim 1, wherein the tines are positioned so that bent inner portions of adjacent tines insert into opposite hub sections.

3. A radial rake according to claim 1, wherein the rakes include an annular ring spaced radially outward from the hub connected to the tines.

4. A radial rake according to claim 1, wherein the rake include tines having a bent outer portion extending annularly in a first direction.

5. A radial rake according to claim 1, wherein the bores in the hub section extend substantially axially, and wherein the alternating bent inner portions extend into the bores.

6. A wheel type radial rake, comprising:

a central hub having opposed hub sections with an axial central opening formed therein;

a plurality of tines extending radially outward, wherein the tines insert intermediate the hub sections, each of the tines having an inner portion extending along an axial direction;

wherein each of the hub sections has a plurality of axially extending bores formed therein spaced in an annular ring and configured for receiving the inner portions of the tines.

7. A radial rake according to claim 6, wherein the plurality of tines include adjacent alternating inner portions extending in axially opposite directions to alternating hub sections.

8. A radial rake according to claim 6, wherein the hub sections further comprise a plurality of raised portions annularly spaced on the hub sections radially outward from the bores, wherein the raised portions are spaced to receive one of the plurality of tines between adjacent raised portions.

* * * * *